Oct. 31, 1967 — W. G. P. DOYLE ETAL — 3,350,001
METHOD FOR FLUID EXTRACTION AND APPARATUS THEREFOR
Original Filed Oct. 20, 1964 — 3 Sheets-Sheet 2
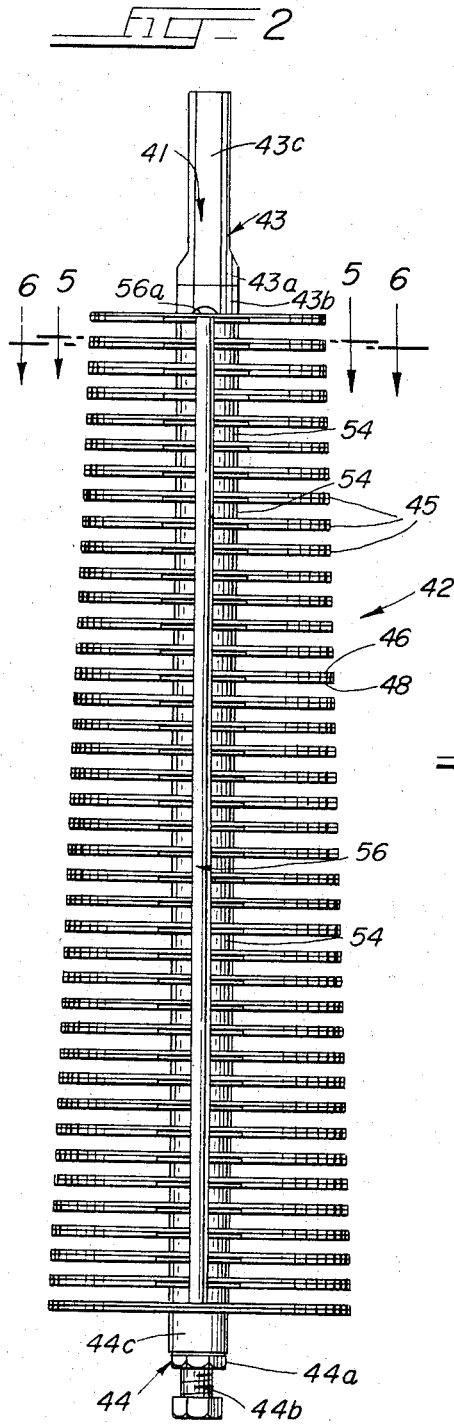
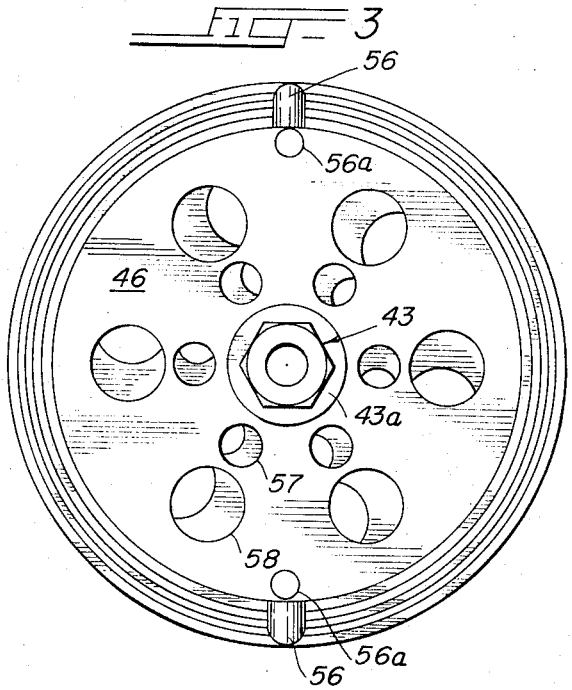
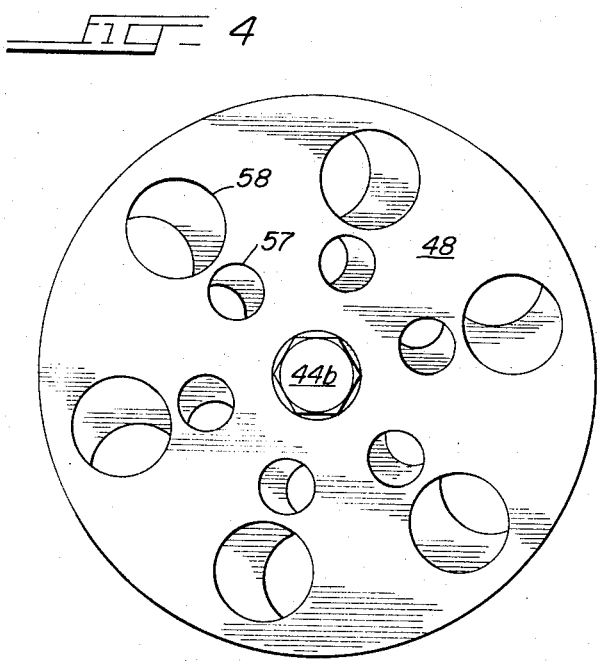
INVENTORS.
WLADZIA G. PODBIELNIAK DOYLE
COLLIN M. DOYLE
BY Mullin & Alter
ATTYS.

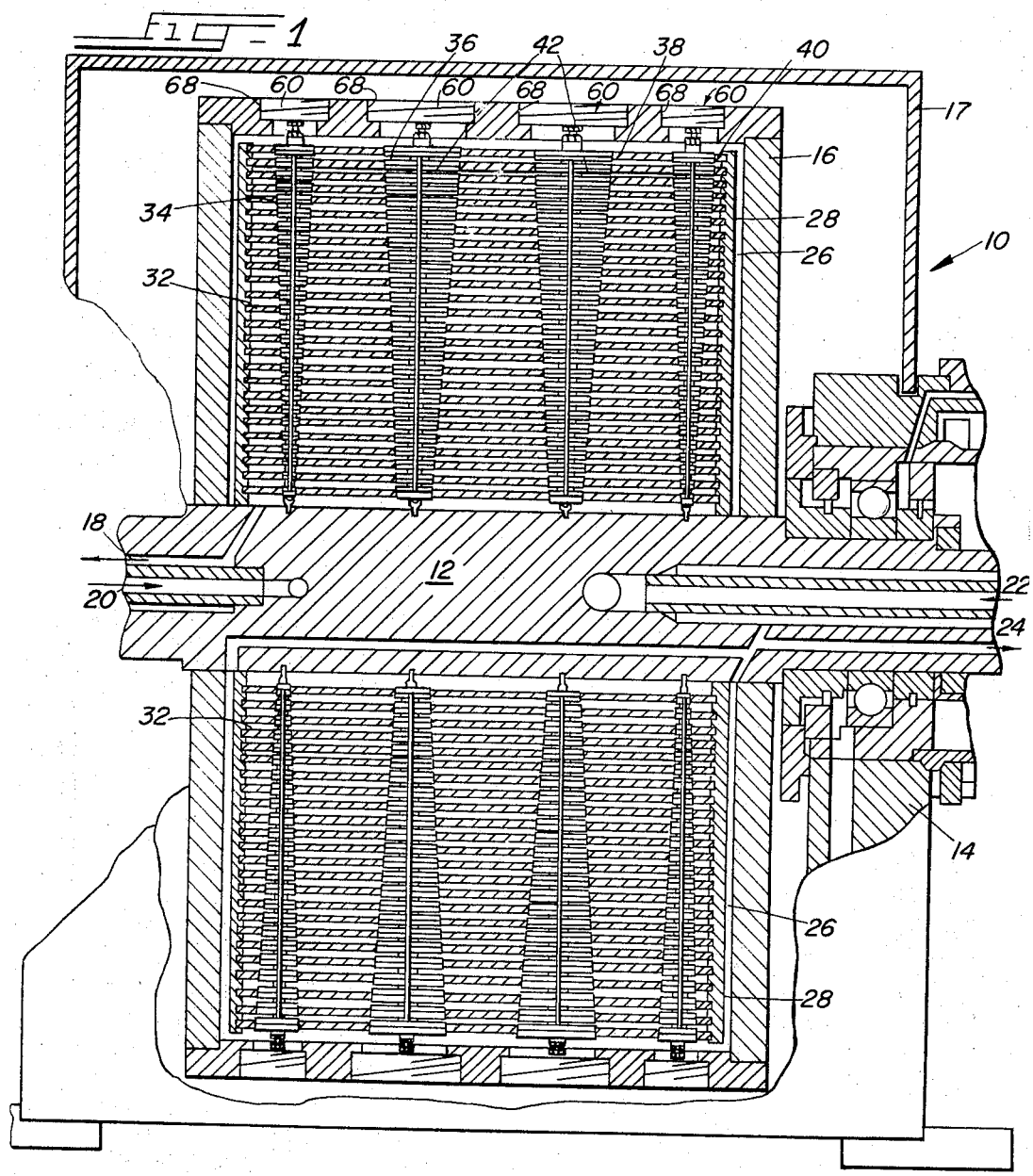

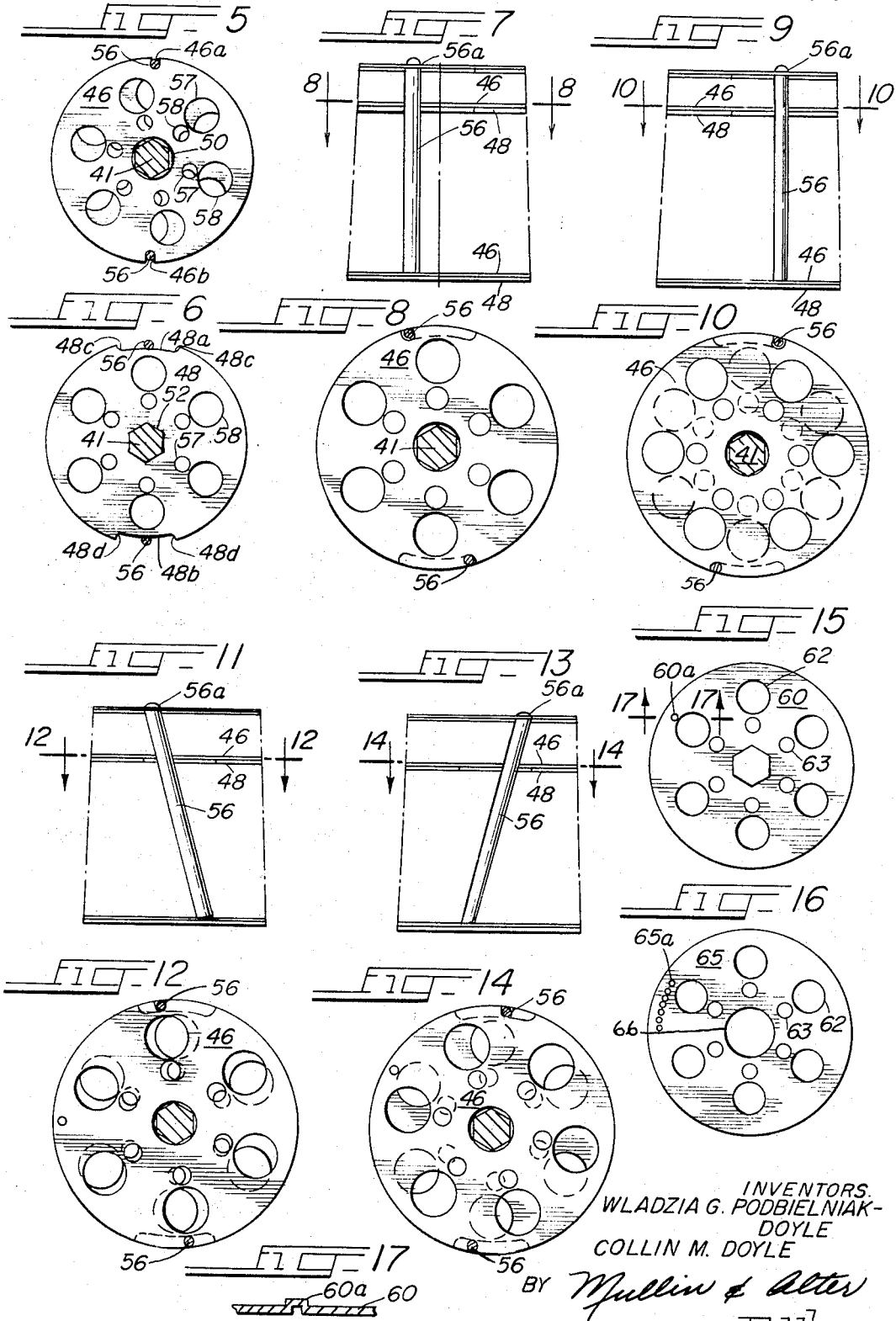

United States Patent Office 3,350,001
Patented Oct. 31, 1967

3,350,001
METHOD FOR FLUID EXTRACTION AND
APPARATUS THEREFOR
Wladzia G. Podbielniak Doyle and Collin M. Doyle,
both of 21 W. Elm St., Chicago, Ill. 60610
Continuation of application Ser. No. 405,055, Oct. 20,
1964. This application Mar. 4, 1966, Ser. No. 540,785
14 Claims. (Cl. 233—15)

ABSTRACT OF THE DISCLOSURE

A method of fluid extraction in which at least two liquids, one a solvent and the other a solute, are introduced at spaced apart points into an apparatus. The liquids are dispersed into droplets gradiently (in progressively increasing or decreasing size) as the liquids move into contact with each other; and a centrifugal countercurrent exchange apparatus, for practicing said method, of the indexable disc column type in which indexing rods are associated with the rotatable discs of the disc columns. By appropriate movement of the indexing rods, the size of the perforations of the discs may be varied simultaneously in progressively increasing, decreasing or constant relationship to each other.

---

This invention relates generally to a method for extracting fluids and more particularly pertains to the extraction of fluids in a fluid extraction device whereby the droplet dispersal and mixing energy characteristics of the fluids are varied progressively throughout the device. Still more particularly, the invention relates to improved disc columns of the type described in U.S. Patent Nos. 3,132,100 and 3,114,706 granted to Wladzia Gajda Podbielniak (Doyle) entitled respectively "Disc Columns for Centrifugal Countercurrent Exchange Devices" and "Centrifugal Countercurrent Exchange Device With Interchangeable Disc Columns," which are readily adaptable for use when performing the novel method of the invention herein.

This application is a continuation of our co-pending patent application entitled Disc Columns in Countercurrent Exchange Devices, Ser. No. 405,055, filed Oct. 20, 1964 and now abandoned.

As described in the aforementioned U.S. patents, the efficiency of any extraction device is totally dependent upon the degree of intimate mixing of the fluids and this in turn is achieved by the dispersion of the fluids into droplets. Control of the character and extent of the droplet dispersion affords a means for varying the mixing energy within the device. Hence, the smaller the droplets the more intimate is the contact between the fluids.

Recently, it was discovered that when processing two liquids in a countercurrent exchange device which have the tendency to emulsify, the emulsification could be averted if the droplet dispersal characteristics of the liquids are varied progressively or gradiently throughout the radial length of the countercurrent exchange device. For example, in penicillin extraction when an extractive solvent such as amyl acetate is used, the extractive solvent is fed into the outer or peripheral portion of the rotor, whereas the high potency broth or "beer" containing the penicillin solute and having a greater specific gravity than the extractive solvent is fed into the rotor adjacent the periphery of the rotor. When the broth is at maximum potency, there is the greatest tendency for the liquids to emulsify upon contacting each other. Hence, to prevent the emulsion in this example, the droplet dispersion of the liquids should be at the maximum adjacent the axis of the rotor. As the broth flows outwardly toward the periphery of the rotor and contacts the extractive solvent, the potency of the broth decreases progressively. When the high gravity broth finally reaches the input position of the low gravity extractive solvent, the potency of the broth is substantially reduced from what it was when the broth was initially introduced. At this radial level within the rotor, the fresh extractive solvent extracts the remaining penicillin solute from the broth. With the potency of the broth at a minimum strength adjacent the periphery of the rotor, there is no longer the tendency of the liquids to emulsify. Hence, the droplet dispersion at this level may be made minimal to afford maximum liquid contact. Therefore, since the extraction of the solute from the broth takes place progressively through the rotor, the tendency of the liquids to emulsify decreases as the broth travels toward the periphery. Consequently, the droplet dispersion could be safely decreased on a graduated or progressive basis from the axis to the periphery of the rotor which corresponds to the progressive decrease in the potency of the broth.

In the case where chloroform is used as an extractive solvent, the droplet dispersion characteristics of the exchange device should be the converse. Since the chloroform is a higher gravity liquid than the high potency broth or beer, it would be introduced near the axis of the rotor, whereas the high potency broth would be introduced near the periphery of the rotor. As in the other example, the tendency to emulsify would be greater at the area or radial level where the high potency broth is initially introduced, which now is adjacent the periphery of the rotor. Accordingly, to prevent the occurrence of liquid emulsion and to have optimum system efficiency, the droplet diepersion pattern should vary progressively from a maximum droplet dispersion adjacent the periphery of the rotor to a minimum droplet dispersion adjacent the axis of the rotor.

Similarly in other types of liquid extraction devices; i.e., gravity columns, mixers and settlers, rotating disc columns, centrifuges, etc., the same conditions would prevail.

It is therefore a primary object of this invention to provide a method of efficient fluid extraction. It is a related object to efficiently extract a substance from contacting liquids without causing the emulsification of liquids when extracting the desired substance therefrom.

It is another object to provide a method for varying the contacting surface area between two mixed liquids in order to efficiently extract a particular substance therefrom and to optimize the amount of liquids which could be processed during a given unit of time.

It is another object to provide a method for efficiently extracting a substance from contacting liquids within a centrifugal countercurrent exchange device.

It is still another object to optimize the efficiency of operation of solvent extraction devices, including countercurrent devices, by decreasing progressively the size of the droplet dispersion to correspond to the decrease in the potency of the fluid from which the solute is being extracted.

It is therefore a primary feature of this invention to provide spaced apart partition walls having apertures therein. The combined areas of the apertures within each wall are made to vary progressively from the point of introduction of one fluid to the point of introduction of a second fluid. The relative aperture areas determine the relative contacting surface areas between fluids at various positions between said points of fluid introduction.

In the countercurrent exchange devices described in the aforementioned patents, removable disc columns were used to vary the droplet dispersion characteristic of the device by varying the perforation pattern of the disc columns. These exchange devices comprised a rotor having spaced concentric separator bands therein with a plurality of series of aligned holes arranged to afford cavities extending radially from the innermost to the outermost of the separator bands. The disc columns were removably positioned in each of said cavities. In said Patent No. 3,114,706, the droplet dispersion pattern was varied by the interchanging of the disc columns. However, to achieve the maximum degree of adjustability and versatility in these devices, it was required to stock a great number of complete disc columns and/or a great number of individual discs of varying perforation patterns. The disc columns described in said Patent No. 3,132,100 overcame this undesirable feature and comprised an elongated tie rod of polygonal cross-section having a plurality of disc assemblies removably mounted thereon with each disc assembly separated one from the other by a tubular vertical spacer removably postioned on said tie rod. Each disc assembly included a pair of perforated contiguously, superimposed discs formed with polygonal central openings of complementary configuration to that of the polygonal cross-section of the tie rod, thereby enabling the same to be removably mounted on said tie rod. The cooperation of the tie rod and central openings of the discs for each disc assembly afforded indexing means for varying the perforation pattern of the disc assemblies by changing positions of one disc in relation to the other disc, in order that various conditions of droplet dispersion could be achieved. Although these disc columns were an improvement, they nevertheless had many objectionable features. For example, if a variation in the perforation pattern of the disc column was necessary, it was required to remove the individual disc assemblies from the tie rod and reposition the discs of the disc assembly around the tie rod. Moreover, the adjustability of the discs was limited by the number of sides of the polygonal configuration of the tie rod cross-section. Furthermore, these disc columns did not have the capability to vary the perforation pattern throughout the radial length of the rotor on a precise graduated basis and hence these exchange devices operated at less than optimum efficiency.

An improved disc column is disclosed in this application which overcomes the aforementioned problems and is capable of providing in a simple and precise manner, the desired graduated droplet dispersal pattern throughout the countercurrent exchange device. Said improved disc column generally comprises a plurality of disc assemblies and each of these disc assemblies comprises a stationary disc and a movable disc selectively rotatable with relation to each other without necessitating the removal of the discs from the disc column. An indexing rod is associated with each of the movable discs, which permits the rotation of all of the discs simultaneously to achieve a uniform perforation pattern or a graduated perforation pattern. In another embodiment, the disc assemblies each having a movable disc with a plurality of indexing perforations that cooperate with an indexing projection on a fixed disc to accomplish graduated indexing of the disc perforations.

It is therefore another primary object of this invention to provide an improved disc column for countercurrent exchange devices wherein the disc column is completely adjustable to different perforation patterns without requiring the removal of any discs therefrom and with but a minimum number of operations to adjust the disc column.

Still another important object of this invention is to provide an improved disc column for countercurrent exchange devices of the character described wherein the movable discs thereof can be adjusted simultaneously with one operation to achieve either a uniform or a graduated perforation pattern throughout the disc column.

Yet a further object of this invention is to provide an improved disc column of the character described which may be inexpensively fabricated and yet is most efficient for the purposes intended.

With the foregoing and other objects in view, which will appear as the description proceeds, the invention consists of certain novel methods and features of construction, arrangement and a combination of parts hereinafter fully described, illustrated in accompanying drawings, and particularly pointed out in the appended claims, it being understood that various changes in the form, proportion, size, and minor details of structure may be made without departing from the spirit or sacrificing any of the advantages of the invention.

For the purpose of facilitating an understanding of our invention, we have illustrated in the accompanying drawings preferred embodiments, from an inspection of which, when considered in connection with the following description, our invention, its mode of construction, assembly and operation, and many of its advantages should be readily understood and appreciated.

Referring to the drawings, in which like characters of reference are employed to indicate corresponding parts throughout the several figures:

FIG. 1, is a fragmentary, vertical sectional view of a centrifugal countercurrent exchange device with interchangeable disc columns embodying the principles of our invention;

FIG. 2, is an enlarged vertical view of an improved disc column embodying the principles of our invention;

FIG. 3, is a top view of FIG. 2;

FIG. 4, is a bottom view of FIG. 2;

FIG. 5, is a cross-sectional view taken on the plane of line 5—5 in FIG. 2 and viewed in the direction indicated;

FIG. 6, is a cross-sectional view taken on the plane of line 6—6 in FIG. 2 and viewed in the direction indicated;

FIG. 7, is a fragmentary view similar to FIG. 2, but with only one indexing rod and the inner and outer disc assemblies shown with one other disc assembly, said indexing rod being shown in its "open position";

FIG. 8, is a cross-sectional view taken on the plane of line 8—8 in FIG. 7, viewed in the direction indicated and illustrating the relationship of the discs of a disc assembly in its "open position";

FIG. 9, is a fragmentary elevational view similar to FIG. 7, wherein the disc assemblies are shown with the indexing rod in its closed position;

FIG. 10, is a sectional view taken on the plane of line 10—10 in FIG. 9, viewed in the direction indicated, and illustrating the relationship of the discs of a disc assembly in its "closed position";

FIG. 11, is a fragmentary, elevational view similar to FIGS. 7 and 9, wherein the indexing rod thereof is torsionally positioned to afford a "graduated" perforation pattern in the disc assemblies;

FIG. 12, is a sectional view taken on the plane of line 12—12 in FIG. 11 and viewed in the direction indicated;

FIG. 13, is a view similar to FIG. 11, wherein the indexing rod is torsionally disposed to afford a graduated perforation pattern in the disc assembly opposite from that shown in FIG. 11;

FIG. 14, is a sectional view taken on the plane of line 14—14 in FIG. 13 and viewed in the direction indicated;

FIG. 15, is a plane view of a modified stationary disc to be used in a disc column without an indexing rod;

FIG. 16, is a modified movable disc to be used in superimposed relationship with the disc of the embodiment shown in FIG. 15; and FIG. 17, is a sectional view taken on the plane of line 17—17 in FIG. 15.

Referring to the drawings, a preferred embodiment is illustrated which may be used when performing the method of our invention. However, as will be more apparent as the description proceeds, other structural arrangements may be used and are within the contemplation of the invention. Turning now to FIG. 1, the reference numeral 10 indicates generally a centrifugal countercurrent exchange device. Since the basic countercurrent exchange device 10 is generally well known and a detailed description of it appears in the aforementioned U.S. Patent Nos. 3,114,706 and 3,132,100, only so much thereof as is necessary for an understanding of the subject invention will be described. The device thus comprises a shaft 12 suitably journalled for rotation in a supporting structure 14. A rotor 16 is rigidly connected to the shaft 12 for rotation therewith, and the entire device may be enclosed in a removable protective cover 17.

Suitable passageways such as 18 and 20 are provided in the shaft 12 for respectively supplying the heavier liquid to the central area of the rotor 16 and removing the lighter liquid therefrom. Similarly, suitable passages such as 22 and 24 are provided for respectively supplying the lighter liquid under pressure to the peripheral area of the rotor 16 and removing the heavier liquid therefrom. Communicating with the passageway 24 for removing the heavier liquid may be passageways 26, provided between the spill-over discs 28 as indicated. The separator bands 32 may be slightly perforated or preferably completely imperforate over their entire areas save for a plurality of holes arranged in aligned relationship to afford a series of disc column cavities such as 34, 36, 38 and 40.

Removably positioned within each of the cavities 34, 36, 38 and 40, is one of our novel disc columns 42. The disc column 42 (see FIG. 2) comprises a central tie rod 41, which is hexagonal in cross-section throughout its length except for the end portions 43, 44. The end portion 43 may include a shoulder portion 43a and a washer portion 43b interposed between the shoulder portion 43a and the disc assemblies 45. As seen in FIG. 2, the end portion 43 terminates in a polygonal shape 43c that is dimensioned to be received in openings suitably drilled and positioned in the drive shaft 12 at the inner portion of the rotor 16. The end portion 44 of each of the disc columns is associated with the outer wall of the rotor 16 as will be more fully explained hereafter. Although the cross section of the tie rod 41 is shown as being hexagonal, other noncircular constructions of the tie rod 41 are contemplated.

Removably mounted on the tie rod 41 is a plurality of disc assemblies 45 (FIG. 2). Each of the disc assemblies 45 includes a movable disc 46 and a stationary disc 48 in contiguously superimposed relationship. The movable discs 46 have central circular openings 50 circumscribing the hexagonal tie rod 41 and being sized to afford rotation therearound for the purpose of indexing the disc assemblies 45. The stationary discs 48 have hexagonal central openings 52 having the identical configuration of the cross-section of the tie rod 41. Thus, once the stationary discs 48 are assembled with the tie rod 41 protruding through their central openings, they cannot be rotated.

Each of the discs 46, 48 are preferably formed with a plurality of perforations of varying size such as 57, 58 (FIG. 4). The size and shape of said perforations are substantially identical in each disc assembly. The perforations 57, 58 of each disc are radially spaced from the center of each disc assembly 45 and are arcuately spaced equally one from the other around the center of each of said disc assemblies. Thus, when the disc assemblies 45 are positioned with the sets of perforations 57, 58 of the movable discs 46 thereof in alignment with the sets of perforations 57, 58 of the stationary discs, the disc assemblies are in their "open position" as shown in FIG. 8. Conversely, when the movable discs 46 are positioned so that the perforations in both discs of the disc assembly are completely obstructed, the disc assemblies are in their "closed position," as illustrated in FIG. 10.

Our disc columns are similar to those described in U.S. Patent No. 3,132,100 in that vertical spacers 54 are interposed between each pair of disc assemblies 45 and they are removably mounted on the tie rod 41, to provide spacing of the disc assemblies in accordance with the separator bands 32. However, the disc assemblies 45 are retained by the shoulder portion 43a at end portion 43; and the other end portion 44 is provided with a means for releasably locking the discs for the purpose of indexing. As will be seen from FIG. 2, a lock nut 44a cooperates with the tie rod 41 by threadedly engaging a cap screw 44b which in turn threadedly engages the end of the tie rod. The lock nut 44a is separated from the disc assemblies 45 by a lock washer 44c. Thus, when the movable discs 46 are positioned in their desired places, the tightening of the lock nut 44a releasably locks the disc assemblies 45 in the positions desired. The cap screw 44b also serves as a means for adjusting the length of the tie rod so that it can be extended within the rotor casing.

Once the disc columns 42 are indexed and locked into position, they are operationally retained in the rotor 16 by means of their end portions 43 being positioned in the shaft 12 as seen in FIG. 1. A plurality of circular portholes 68 may be provided in the cylindrical outer wall of the rotor in alignment with each of the cavities 34, 36, 38 and 40. Plugs 60 may be threadedly associated with each of the portholes 68 and the same preferably abut the heads of the cap screws 44b after the length of the cap screws 44b have been adjusted to operationally retain each of the disc columns 42 within the rotor. For purposes of explanation, the disc assemblies 45 closest to the shaft will be referred to as the inner disc assembly; and the disc assemblies 45 closest to the outer end of the rotor will be called the outer disc assembly.

As seen in FIG. 5, each movable disc 46 includes openings 46a, 46b which open to the periphery and are diametrically opposed. A pair of indexing rods 56, 56 may be associated with the movable discs 46 by extending through the aligned openings 46a, 46b in all of said movable discs of the disc column 42. In the preferred construction, the indexing rods 56, 56 are shown fixedly attached at 56a to the movable disc of the inner disc assembly and hence is adjacent to the shaft of the device 10 when the disc columns 42 are assembled in the device. The indexing rods 56, 56 are removably associated with all the other openings of the movable discs 46 of the disc assemblies 45. The indexing rods 56, 56 correspond in length to the distance between the top and the bottom movable discs of the disc column 42; and they each have an extending portion overlapping the movable disc 46 of the outer disc assembly.

As seen in FIG. 6, each of the stationary discs 48 are formed with a pair of diametrically-opposed, peripherally-opening, elongated, arcuate indexing grooves 48a, 48b. The indexing rods are positionable and are movable within said grooves. These indexing grooves 48a, 48b have opposite end walls 48c, 48d which limit the path of movement of the indexing rods 56. It has been found that in the case of equally spaced sets of perforations, the movement of the movable disc with relation to the stationary disc an angular distance of one-half (½) of the number of degrees of spacing between the perforations, accomplishes complete indexing of the disc assemblies from an "open position" as illustrated in FIG. 8, to a "closed position" as illustrated in FIG. 10. Accordingly, in the illustrated disc assembly where there is equal spacing of two sets of six perforations 57, 58 the angular length of the arcuate grooves 48a, 48b is thirty (30°) degrees. This provides complete indexing adjustability between the movable discs 46 and the stationary discs 48. From FIG. 4 it will be seen that we have shown the stationary disc in the outer disc assembly as not having any indexing grooves because we have found that this construction enables us to more firmly lock the indexing rods into position when the lock nut 44a is tightened. However, for description purposes, we will refer to all the stationary discs as having the same configuration.

There are many different indexing positions that our novel disc column 42 offers. Turning now specifically to FIGS. 7 and 8 it will be seen that when the indexing rods are rotated to their "open position" at one end of the elongated arcuate indexing grooves 48a, 48b, the movable discs 46 are caused to rotate with respect to the stationary discs 48 and be positioned with their sets of perforations 57, 58 in a fully aligned or "open" relationship. When the indexing rods 56 have been rotated to their "closed position" at the other extreme end of the elongated arcuate indexing grooves 48a, 48b, as illustrated in FIG. 9, the sets of perforations 57, 58 are fully obstructed. As seen in FIG. 2, the indexing rods 56 are shown positioned midway between the ends of the elongated arcuate indexing grooves 48a, 48b. Accordingly, the movable discs 46 have been partially rotated with the stationary discs 48, so that the perforations are partially obstructed as illustrated in FIG. 6.

Still another type of indexing can be achieved when the indexing rods 56 are "torsionally or spirally" moved to the positions illustrated in FIGS. 11 and 13. As shown, one extreme disc assembly 45 is in its "open position" and the opposite extreme disc assembly 45 is in its "closed position." In these positions, the movable discs 46 of the disc column are moved with relation to the stationary discs 48 on a graduated basis so that the sets of perforations 57, 58 in the discs are gradually obstructed. Thus, in the case where the indexing rods have been torsionally moved to the position illustrated in FIG. 11, the inner disc assembly 45 is in its "closed position" with its perforations fully obstructed as seen from FIG. 10. However, the outer disc assembly, which is closest to the periphery of the rotor 16 has its perforations unobstructed. Thus, this disc assembly is in its "open position" as illustrated in FIG. 8. Of course, the disc assemblies that are positioned between the inner disc assembly and outer disc assembly are partially obstructed on a graduated basis. Accordingly, FIG. 12 shows a disc assembly which is disposed near the outer disc assembly as being partially obstructed and nearly completely open. On the other hand, where the indexing rods 56 have been moved to an equal distance from the opposite end wall of indexing groove 48 position as shown in FIG. 14, the same disc assembly of FIG. 12 is substantially more obstructed and nearly closed. If the inner disc assembly of FIG. 13 were shown, it would be fully open, whereas the outer disc assembly would be fully closed, because the indexing rods are in the exact opposite position to that of FIG. 11.

In addition to torsional positioning of the indexing rods 56 with their ends either in the open or closed positions for the extreme opposite disc assemblies as illustrated in FIGS. 11 and 13, the indexing rods could be torsionally positioned at different angles between the two extremes shown. Accordingly, different increments of perforation graduation through the disc columns 42 between these two extremes of fully "open" and fully "closed" may likewise be achieved.

As aforementioned, we have also provided a modified disc assembly for a disc column which is indexable without indexing rods. This modified disc assembly also can be indexed without being removed from a disc column and with a minimum number of operations. Accordingly, FIG. 15 illustrates a modified stationary disc 60 having two sets of multiple perforations such as 62, 63 therein. These perforations are preferably disposed with relation to the discs in the same positions as the aforementioned perforations 57, 58. The modified stationary discs 60 have an hexagonal central opening 64, which can be assembled with relation to a tie rod in the same manner as the discs hereinbefore mentioned. An indexing projection 60a is formed in the modified stationary disc 60; and it is preferably located near the periphery thereof on the same diameter as one of the equally spaced sets of perforations, 62, 63. A modified movable disc 65 having a plurality of arcuately spaced indexing perforations 65a is provided in the modified disc assembly. As in the case of the other disc assemblies 45, it is superimposed in a contiguous relationship with the modified movable disc 61 so that its projecting indexing portion 60a can register with each one of the arcuately spaced indexing perforations 65a. The modified movable disc 61 also has two sets of perforations 62, 63, equally spaced therearound. As in the case of the aforementioned movable discs 46, it also is provided with a central circular opening 66, which is seized to circumscribe, in freely rotatable relationship, the tie rod 41 in order to afford preselected rotational positioning of the modified movable discs 61 with relation to the modified stationary discs 60 for indexing purposes. The arcuately spaced indexing perforations 65a are disposed along the length of a thirty (30°) degree arc which extends from the center diameter of one of the equally spaced sets of perforations 62, 63. The thirty (30°) degree arc is therefore substantially the same length as the elongated arcuate indexing grooves 48a, 48b so that indexing from the "open" to the "closed" positions can be realized.

Thus, it will be seen that when it is desired to index a disc column embodying our modified disc assemblies, each of the modified movable discs is rotated with respect to the modified stationary discs, and the arcuate indexing perforations cooperate with the projecting indexing portions to obtain different degrees of obstruction in the disc assemblies in accordance with the different possible indexing positions. When the modified movable discs are properly set, a locking means such as the locking nut 44a can then be used to hold the modified discs in position.

In the foregoing, an improved disc column was disclosed which is particularly adaptable for accomplishing the method of this invention. The novel method herein enables fluids to be processed efficiently whereby the amount of fluid extraction per unit of time is optimized. Moreover, the method is particularly suitable for efficiently extracting solute from a mixture and at the same time preventing liquids which have the tendency to emulsify from doing the same.

The novel method comprises generally, the introduction of a first quantity of a fluid into an area and the introduction of a second fluid into an area spaced from the area where the first fluid is introduced. The first fluid may be a mixture of fluids which includes a substance or solute which is to be extracted therefrom. The second fluid then would be an extractive fluid for extracting the substance from the first fluid. The fluids are caused to mix together. The extraction takes place within the space between the areas of fluid introduction. However, the quantities of the fluids are caused to be dispersed into streams or into droplets of progressively varying size between the areas of introduction of the fluids. The largest size streams or the minimum dispersion of the quantities of fluid are caused to occur in the area of the extract-rich fluids, and hence adjacent to the area of introduction of the fluid having the extract substance therein. In the area of the extract-rich fluids, extremely intimate contact between the fluids is not essential. Conversely, the smallest size streams or the maximum dispersion of the fluids are caused to occur in the area where the fluids have the least amount of the extract substance therein, and hence should be adjacent the area where the extractive fluid is introduced. In this area, extremely intimate contact between the fluid is necessary in order to extract the remaining substance within the first fluid. By progressively varying the dispersion of the fluids, the effect of the extractive solvent and the available mixing force in extracting the desired substance is optimized.

This method of progressively varying the droplet dispersion of fluids may also be used in any of the known types of solvent extractors, viz, rotating disc columns, mixers and settlers, centrifuges and gravity columns. in these types of systems, intimate contact between fluids for extracting a particular substance is achieved by the downward movement of higher specific gravity fluid and the upward movement of a lower specific gravity fluid. The fluids mix and a substance is extracted therefrom as they pass through spaced apart apertured partition walls which define successive mixing chambers. The progressive variation of the size of the apertures in the partition walls correspondingly varies the contacting surface area of the fluids within the contacting chambers.

The aforementioned method is particularly suited to the centrifugal countercurrent exchange device 10. When the device 10 is used, a first fluid is introduced adjacent the periphery of the rotor and a second fluid having a greater specific gravity than the first fluid is introduced adjacent the axis 12 of the rotor. One of the fluids is an extractive fluid and the other fluid includes a substance or solute to be extracted therefrom. Partitions such as the bands 32 are spaced apart between the axis 12 and the periphery of the rotor to define a plurality of fluid contacting chambers. Perforations are provided within each band to permit communication between chambers. The perforation patterns within the bands are varied progressively between the axis and the periphery of the rotor. The largest perforation pattern which causes a minimum dispersion of the fluids is positioned adjacent the areas of the extract rich fluids. As the countercurrent exchange device operates, the fluids travel between the axis and the periphery of the rotor and the solute is extracted progressively within the radial length of the rotor.

In the example given earlier relating to the processing of penicillin, the broth was dispersed to the greatest degree adjacent the rotor periphery, and therefore the relative size of the droplet pattern of the broth and solvent extraction at the rotor periphery was smaller than at any other area within the rotor. In this manner, the broth which at this radial level contains a very small amount of solute therein, makes extremely intimate contact with the fresh extractive solvent (amyl acetate), and the remaining amount of solute is thereby easily extracted. Furthermore, at the periphery the fluids are able to utilize the increased energy due to the circumferential rotor velocity. This further insures adequate contact between the low potency broth and the solvent, for extracting the remaining penicillin.

The improved disc column 42 affords a precise and convenient means for providing the desired progressive perforation patterns within the rotor. The perforation patterns of the disc assemblies 45 are varied progressively when an upper portion of the indexing rod 56 is positioned adjacent one end wall of the indexing groove 48 in the stationary disc of the outer disc assembly and a lower portion of the indexing rod 56 is positioned adjacent the opposite end wall but of the indexing groove 48 in the stationary disc of the inner disc assembly. In this manner, the maximum relative perforation pattern occurs at one extreme end of the disc column which may be either adjacent the axis or the periphery of the rotor, and the minimum relative perforation pattern occurs at the opposite extreme of the disc column which also may be either adjacent the axis or the periphery of the rotor. Thus, the perforation patterns between the extreme end assemblies vary progressively. Therefore, as is obviously seen, the simple manipulation of the indexing rod provides the desired perforation pattern for the entire disc column 42.

From the foregoing description and drawings, it should be apparent that we have provided both a novel method and a novel and improved disc column which fulfills the stated objects of our invention in a remarkably unobvious and unexpected fashion. As aforedescribed, the disc assemblies have pairs of discs that are readily indexed to afford variously sized perforation patterns with a minimum number of operations and without the necessity for removing the discs from the disc columns. Also, the new and novel indexing means employs indexing rods which enable the disc assemblies to be selectively adjusted in one operation either when it is desired to have a uniform perforation pattern in each of the disc assemblies, or a progressively graduated perforation pattern.

Moreover, our method disclosed herein optimizes the amount of a substance which may be extracted from a fluid mixture in a unit of time by progressively varying the intimate contacting area between fluids. A means of accomplishing this is by progressviely or gradiently varying the perforation patterns in the spaced apart partitioned walls which are positioned between the areas of introduction of the two fluids whose specific gravities vary one from the other. The disc column 42 disclosed herein is particularly suitable to precisely controlling the desired progressive perforation pattern throughout the disc assemblies of the disc column.

Furthermore, our method eliminates the possibility of liquids emulsifying when a solute is extracted from a high potency liquid. This is accomplished by dimensioning the perforation pattern sufficiently large within the areas where the fluids are rich in their content of solute.

Although disc columns used in centrifugal countercurrent exchange devices have been described with great detail as providing the desired progressive aperture variations, other means for achieving the same are within the contemplation of the invention. Moreover, the method may be practiced in means other than centrifugal contactors, such as, for example, gravity columns having spaced apertured decks, mixing and settling tanks, rotating disc columns, etc.

It should be realized that while we have illustrated and described our invention with relation to a pair of straight indexing rods, other indexing rods of different shapes can be embodied in this invention when it is desired to vary the patterns on a different basis other than linearly. Also, it is not necessary to have a pair of indexing rods and indexing grooves to accommodate said indexing rods, as our disc columns could operate with merely one indexing rod and with indexing grooves to accommodate merely one indexing rod.

Still further, it is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. In a centrifugal countercurrent exchange device including a rotor, a shaft, a plurality of spaced concentric bands having holes formed therein to afford a radially extending cavity, a disc column positioned in said cavity, said disc column comprising:
   an elongated tie rod;
   a plurality of disc assemblies removably mounted in spaced relationship on said tie rod, each of said disc assemblies including a movable perforated disc and a stationary perforated disc, said discs being contiguously superposed on each other;
   indexing means to enable the movable discs of said disc assemblies to be rotated in place about said tie rod and thereby vary the indexing of the perforations of said movable disc in relation with the perforations of said stationary disc for the corresponding disc assembly; and
   locking means to prevent said stationary disc from rotating while the movable disc of the corresponding disc assembly is being rotated about the tie rod.

2. In a centrifugal countercurrent exchange device as claimed in claim 1, wherein:
   said tie rod has a non-circular cross-section shape and;
   said stationary disc includes a non-circular central opening complementary to the non-circular cross-sectional shape of said tie rod, said locking means comprising the cooperation of the non-circular tie rod and the complementary non-circular central opening of said stationary disc; and said indexing means comprises rotating means cooperating with a circular central opening formed in said movable discs, said circular opening being dimensioned to accommodate said tie rod therethrough and to permit the rotation of said movable discs about said tie rod, said rotating means being associated with each of said movable discs and capable of simultaneously rotating said movable discs through progressively varying arcuate distances about the tie rod, thereby providing a progressive variation of the perforation patterns through said disc assemblies.

3. In a centrifugal countercurrent exchange device as claimed in claim 2, wherein said rotating means comprises:
   an elongated arcuate indexing groove formed in the stationary discs of said disc assemblies;
   a notch formed in each of the movable discs to accommodate said indexing rod; and
   at least one indexing rod extending through said indexing grooves and through said notches to link said disc assemblies together, said indexing grooves having end walls to limit the movement of said indexing rod, the movement of said indexing rod within said indexing grooves causing only the movable discs to rotate about said tie rod as the indexing rod applies force against the edges of the notches of the movable discs.

4. A countercurrent exchange device as claimed in claim 3, wherein the movable disc and the stationary disc for each assembly have identical sets of perforations therein, the perforations of each of said sets are radially spaced from the center of the disc assembly, said sets of perforations are separated from each other by an equal number of degrees, the arcuate length of said arcuate indexing grooves corresponding to one half (½) of said degree separation between said sets of perforations, said arcuate length of said grooves permitting said indexing rod to vary the openings through said disc assembly between a maximum open position when the indexing rod is positioned at one end of the groove to a fully closed position when the indexing rod is positioned at the other end of said arcuate groove.

5. A countercurrent exchange device as claimed in claim 4, wherein at least one indexing groove of each stationary disc is in alignment with an indexing groove of each of the other stationary discs, the positioning of said indexing rod through said aligned indexing grooves whereby an upper portion of the indexing rod is adjacent one end wall of the arcuate indexing groove of the stationary disc of one of said end assemblies and a lower portion of the indexing rod is adjacent the opposite end wall of the arcuate indexing groove of the opposite end disc assembly provides a progressively varying perforation pattern through said disc column from one of said end disc assemblies to the other of said end disc assemblies, said progressively varying perforation pattern causing the intimate fluid contacting area to correspondingly vary in a progressive manner.

6. A countercurrent exchange device as defined in claim 5, wherein:
   the upper end of said indexing rod is fixedly attached to the movable disc of the outer upper end disc assembly;
   the stationary disc of said lower end disc assembly does not have an indexing groove to receive said indexing rod and thereby serves to protect the lower end of the indexing rod from being moved out of place; and
   a closure means threadedly associated with said tie rod to maintain said disc assemblies securely in place when tightly abutting against said lower stationary disc.

7. A countercurrent exchange device, as claimed in claim 1, wherein each of said movable discs is formed with a plurality of indexing perforations disposed at an equal distance radially around the center thereof, each of said stationary discs having an integrally formed projecting index portion protruding outwardly therefrom and being sized and disposed to be received by any of said indexing perforations in said movable discs, whereby said movable disc of each disc assembly can be rotatably indexed with relation to each of said stationary discs in a plurality of fixed positions by moving the disc with the indexing perforations to alignment of one of the preselected perforations with the projecting indexing portion of the stationary disc of the corresponding disc assembly.

8. A countercurrent exchange device, as claimed in claim 7, wherein said discs of each disc assembly are of the same size and have identical sets of perforations therein, and each set of said perforations are radially spaced from the center of said disc assemblies and are arcuately spaced apart equally one from the other about the center of said disc assemblies.

9. A countercurrent exchange device, as claimed in claim 8, wherein said indexing perforations and projections are disposed near the peripheries of said discs, and said indexing perforations are disposed within an arc equal in length to half of the degree spacing between said sets of perforations, said indexing perforations being located with respect to each of said indexing projections to enable said movable discs to be indexed to fixed positions within said arc between an open perforation position and a closed perforation position.

10. A method of fluid extraction comprising:
   introducing a quantity of an extractive solvent fluid into a first area;
   introducing a quantity of a fluid having a substance to be extracted therefrom into a second area spaced from the area of introduction of said solvent fluid;
   moving said fluids towards each other; and
   causing said quantities of fluids to be dispersed gradiently between said points of introduction of said fluids to vary gradiently the area of intimate contact of said fluids between said areas of introduction, the minimum dispersion of said fluids occuring adjacent the area of introduction of the quantity of said fluid having said substance to be extracted therefrom.

11. A method of fluid extraction as claimed in claim 10, wherein the gradient dispersal of said fluids is caused by moving said fluids through spaced apart perforations of progressively variable size between the areas of introduction of the fluids, the larger of said perforations acting as a conduit means for extract-rich fluids.

12. A method of fluid extraction as claimed in claim 10, wherein said fluids are liquids and perforated spaced apart partition walls are positioned between the areas of introduction of said liquids, the areas of the perforations of the partition walls varying gradiently from the innermost to the outermost partition wall, the gradient dispersal of said fluids is caused by passing said liquids through the perforations of said partition walls whereby the largest area of said perforations is within the partition wall adjacent the point of introduction of the liquid having said substance therein.

13. A disc column for countercurrent exchange devices comprising:
   holding means;
   a plurality of disc assemblies mounted in spaced relationship and maintained in position by said holding means, each of said disc assemblies including a movable perforated disc and a stationary perforated disc, said discs being superposed one on the other; and
   indexing means capable of simultaneously rotating all of said movable discs with respect to said stationary discs of the corresponding disc assemblies through arcuate paths the length of which vary from movable disc to movable disc, thereby providing gradient variation of the perforation patterns through said disc assemblies.

14. The disc column of claim 13 wherein said indexing means comprises at least one indexing rod associated with each of said movable discs, said indexing rod being operatively movable in a path other than about its own axis to cause rotation of said movable discs.

References Cited

UNITED STATES PATENTS

| | | | |
|---|---|---|---|
| 563,307 | 7/1896 | Paulus | 137—625.31 X |
| 659,514 | 10/1900 | Duffy | 137—625.31 X |
| 1,911,044 | 5/1933 | Thrasher | 251—297 X |
| 3,023,775 | 3/1962 | Becker | 137—625.3 X |
| 3,116,246 | 12/1963 | Podbielniak | 233—15 |
| 3,132,100 | 5/1964 | Podbielniak | 233—15 |

HENRY T. KLINKSIEK, *Primary Examiner.*

M. CARY NELSON, *Examiner.*